US011951774B2

United States Patent
Watanabe

(10) Patent No.: US 11,951,774 B2
(45) Date of Patent: Apr. 9, 2024

(54) PNEUMATIC TIRE

(71) Applicant: The Yokohama Rubber Co., LTD., Tokyo (JP)

(72) Inventor: Daisuke Watanabe, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 512 days.

(21) Appl. No.: 17/042,046

(22) PCT Filed: Mar. 22, 2019

(86) PCT No.: PCT/JP2019/012135
§ 371 (c)(1),
(2) Date: Sep. 25, 2020

(87) PCT Pub. No.: WO2019/188804
PCT Pub. Date: Oct. 3, 2019

(65) Prior Publication Data
US 2021/0023888 A1 Jan. 28, 2021

(30) Foreign Application Priority Data
Mar. 26, 2018 (JP) .................................. 2018-058351

(51) Int. Cl.
*B60C 11/12* (2006.01)
*B60C 11/03* (2006.01)

(52) U.S. Cl.
CPC ...... *B60C 11/1236* (2013.01); *B60C 11/0306* (2013.01); *B60C 2011/0339* (2013.01); *B60C 2011/1209* (2013.01)

(58) Field of Classification Search
CPC ............ B60C 11/1236; B60C 11/0306; B60C 11/1204; B60C 11/1281;
(Continued)

(56) References Cited

U.S. PATENT DOCUMENTS

| | | | |
|---|---|---|---|
| 2010/0186861 A1* | 7/2010 | Ishiguro | B60C 11/1369 152/209.25 |
| 2018/0015789 A1* | 1/2018 | Horiguchi | B60C 11/0306 |
| 2021/0221181 A1* | 7/2021 | Ebiko | B60C 11/1272 |

FOREIGN PATENT DOCUMENTS

| | | | | |
|---|---|---|---|---|
| JP | S60-255506 | | 12/1985 | |
| JP | H1024710 A | * | 1/1998 | ............ B60C 11/12 |

(Continued)

OTHER PUBLICATIONS

International Search Report for International Application No. PCT/JP2019/012135 dated Jun. 4, 2019, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

A pneumatic tire includes a center land portion, intermediate land portions, and shoulder land portions each with sipes arranged at intervals in a circumferential direction. Center land sipes have a widened portion with a wide groove width at one end. Shoulder land sipes extend from the outer side of a ground contact end in a lateral direction toward an outer main groove. The orientation of the center and shoulder land sipes with respect to the circumferential direction is opposite to the orientation of intermediate land sipes. Respective inclination angles $\theta_{CE}$, $\theta_{MD}$, $\theta_{SH}$ of the center, intermediate and shoulder land sipes satisfy $\theta_{CE} < \theta_{MD} < \theta_{SH} < 90°$, an end of the intermediate land sipe on the side of the inner main groove is between ends of the center land sipes, and at any position on the entire circumference at least one center or intermediate land sipe is present on a meridian.

8 Claims, 3 Drawing Sheets

(58) Field of Classification Search
CPC ..... B60C 2011/0339; B60C 2011/0341; B60C 2011/0372; B60C 2011/0374; B60C 2011/0381; B60C 2011/0383; B60C 2011/0388; B60C 2011/0395; B60C 2011/1209

See application file for complete search history.

(56) References Cited

FOREIGN PATENT DOCUMENTS

| | | | | |
|---|---|---|---|---|
| JP | 2004-314787 | | 11/2004 | |
| JP | 2010-168006 | | 8/2010 | |
| JP | 2012-056464 | | 3/2012 | |
| JP | 2012056464 A | * | 3/2012 | ............. B60C 11/03 |
| JP | 2012-086665 | | 5/2012 | |
| JP | 2012086665 A | * | 5/2012 | ............. B60C 11/12 |
| JP | 2013-018309 | | 1/2013 | |
| JP | 2014-205410 | | 10/2014 | |
| JP | 2017-196978 | | 11/2017 | |
| WO | WO 2017/187734 | | 11/2017 | |
| WO | WO-2017187734 A1 | * | 11/2017 | ............. B60C 11/03 |

* cited by examiner

PNEUMATIC TIRE

TECHNICAL FIELD

The present technology relates to a pneumatic tire suitable as an all-season tire and particularly relates to a pneumatic tire that can improve snow performance while suppressing the occurrence of pattern noise.

BACKGROUND ART

In all-season tires, there is a demand to exhibit excellent snow performance during snowfall. In the known all-season tire, land portions defined by a plurality of main grooves each are provided with a plurality of sipes, thereby increasing edge components to improve snow performance (for example, see Japan Unexamined Patent Publication No. 2014-205410). However, depending on the arrangement of the sipes provided in the tread portion, there is a problem that variations in the area of grooves at the ground contact leading edge are large, to easily generate pattern noise is easily generated.

SUMMARY

The present technology provides a pneumatic tire that can improve snow performance while suppressing pattern noise.

A pneumatic tire according to an embodiment of the present technology for achieving the above-described object includes: an annular tread portion extending in a tire circumferential direction; a pair of sidewall portions disposed on both sides of the tread portion; and a pair of bead portions disposed inward of the sidewall portions in a tire radial direction, the tread portion being provided with four main grooves including a pair of outer main grooves and a pair of inner main grooves that extend in the tire circumferential direction, the main grooves defining a center land portion, a pair of intermediate land portions located outward of the center land portion, and a pair of shoulder land portions located outward of the intermediate land portions, wherein the center land portion, the intermediate land portions, and the shoulder land portions each are provided with a plurality of sipes arranged at intervals in the tire circumferential direction, the sipes in the center land portion each have a widened portion formed with a wide groove width at one end, the sipes in the shoulder land portions each extend from an outer side of a ground contact end in a tire lateral direction toward the outer main groove, orientation of the sipes in the center land portion and the shoulder land portions with respect to the tire circumferential direction is opposite to orientation of the sipes in the intermediate land portions, an inclination angle $\theta_{CE}$ of the sipes in the center land portion with respect to the tire circumferential direction, an inclination angle $\theta_{MD}$ of the sipes in the intermediate land portions with respect to the tire circumferential direction, and an inclination angle $\theta_{SH}$ of the sipes in the shoulder land portion with respect to the tire circumferential direction satisfy a relationship $\theta_{CE}<\theta_{MD}<\theta_{SH}<90°$, an end of the sipe in the intermediate land portion on the side of the inner main groove is disposed between ends of the adjacent sipes in the center land portion in the tire circumferential direction, and at any position on the entire circumference of the tire, at least one of the sipe in the center land portion and the sipe in the intermediate land portion is present on a tire meridian.

According to the present technology, the center land portion, the intermediate land portions, and the shoulder land portions each are provided with the plurality of sipes arranged at intervals in a tire circumferential direction, the sipes of the center land portion each have the widened portion formed with a wide groove width at one end thereof, and the sipes of the shoulder land portion each extend from the outer side of the ground contact end in a tire lateral direction toward outer main groove. Therefore, snow performance (particularly steering stability performance on snow-covered road surfaces) can be improved while efficiently increasing edge components. Additionally, since the orientation of the sipes in the center land portion and the shoulder land portions with respect to the tire circumferential direction is opposite to the orientation of the sipes in the intermediate land portions, the sipes in the land portions appropriately acts on the ground contact leading edge, and since the inclination angle $\theta_{CE}$ of the sipes, the inclination angle $\theta_{MD}$ of the sipes, and the inclination angle $\theta_{SH}$ of the sipe satisfy the relationship $\theta_{CE}<\theta_{MD}<\theta_{SH}<90°$, the generation of pattern noise can be suppressed while improving snow performance. Further, since the end of the sipe in the intermediate land portion on the side of the inner main groove is disposed between ends of the adjacent sipes in the center land portion in the tire circumferential direction, and at any position on the entire circumference of the tire, at least one of the sipe in the center land portion and/or the sipe in the intermediate land portion is present on the tire meridian, variations in the area of the grooves at the ground contact leading edge can be suppressed, reducing the occurrence of pattern noise.

According to the present technology, it is preferred that the sipes in the shoulder land portions do not communicate with the outer main groove. This can suppress reduction in the block rigidity of the shoulder land portions, thereby suppressing the occurrence of pattern noise.

According to the present technology, it is preferred that a width W1 of the center land portion, a width W2 of the intermediate land portion, and a width W3 of the shoulder land portion in a ground contact region satisfy a relationship W1<W2<W3. As a result, edge components that contribute to the improvement of snow braking and snow traction can be increased, effectively improving snow performance.

According to the present technology, it is preferred that a plurality of lug grooves extending in the tire circumferential direction while intersecting with the sipe in the intermediate land portion are provided in the intermediate land portions, and one end of the lug groove opens to the outer main groove, and an other end terminates within the intermediate land portion. Since the plurality of lug grooves extending in the tire circumferential direction while intersecting with the sipe in the intermediate land portion are provided, snow performance can be improved and variations in the area of the grooves at the ground contact leading edge can be reduced. Additionally, since one end of the lug groove opens to the outer main groove, and the other end terminates within the intermediate land portion, the occurrence of pattern noise can be suppressed.

According to the present technology, the lug grooves of the intermediate land portions each preferably have an acute bent portion. As a result, edge components can be increased, thereby effectively improving snow performance.

According to the present technology, the sipes are grooves having a groove width of 1.5 mm or less. The ground contact end is an outermost position of the ground contact region in the tire lateral direction. The "ground contact region" refers to a region in the tire lateral direction corresponding to the maximum linear distance in the tire lateral direction of a ground contact surface formed on a flat plate when a tire is inflated to an air pressure, which corresponds to the maximum load capacity defined by the standards (JATMA (The Japan Automobile Tyre Manufacturers Association, Inc.), TRA (The Tire and Rim Association, Inc.), ETRTO (The European Tyre and Rim Technical Organisation), and the like), and is placed vertically on the flat plate in a stationary state, and loaded with a load equivalent to 80% of the maximum load capacity.

DETAILED DESCRIPTION

Figure 1:
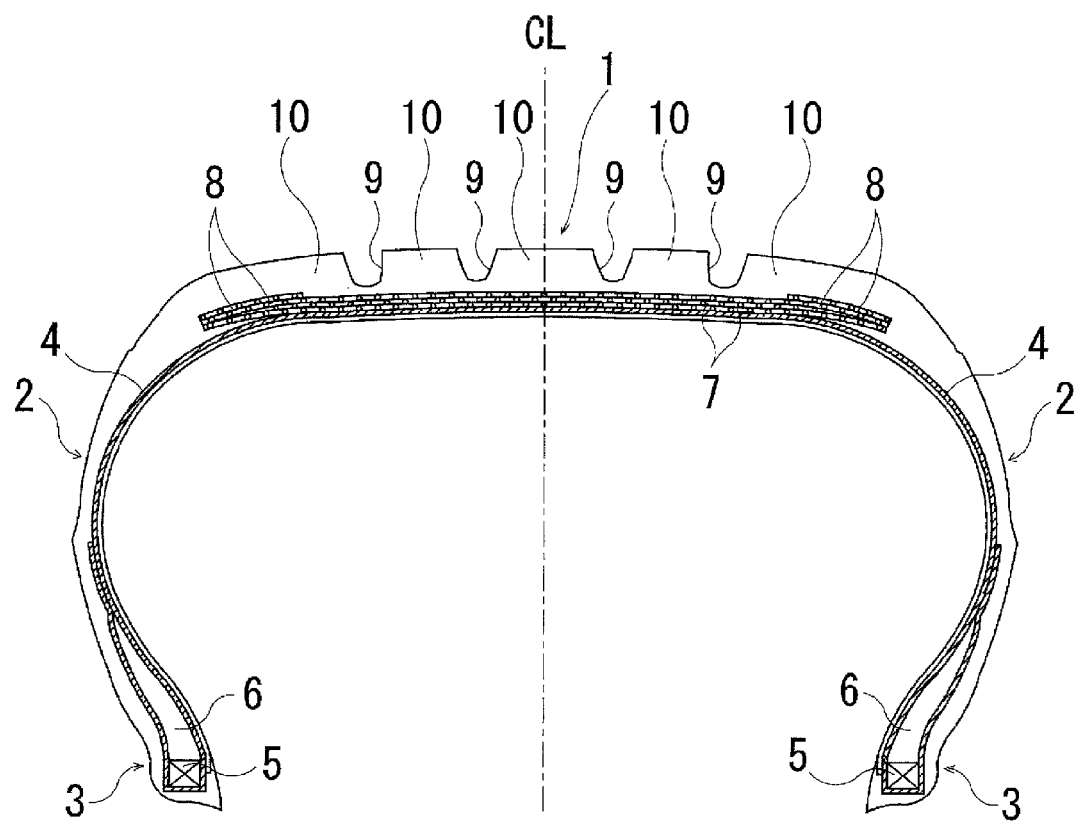
FIG. 1 is a meridian cross-sectional view illustrating a pneumatic tire according to an embodiment of the present technology.
Figure 2:
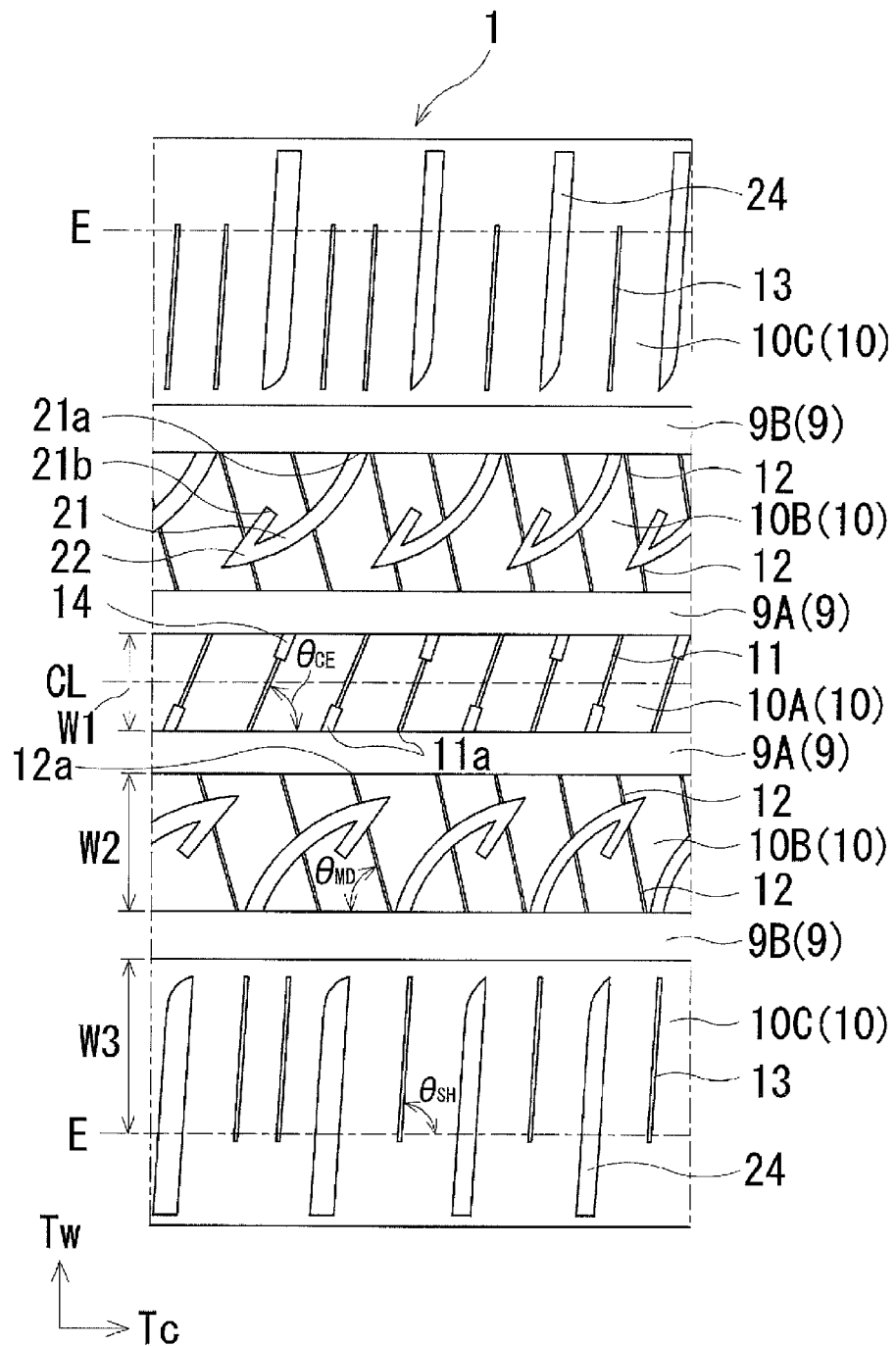
FIG. 2 is a plan view illustrating an example of a tread portion of a pneumatic tire according to the embodiment of the present technology.
Figure 3:
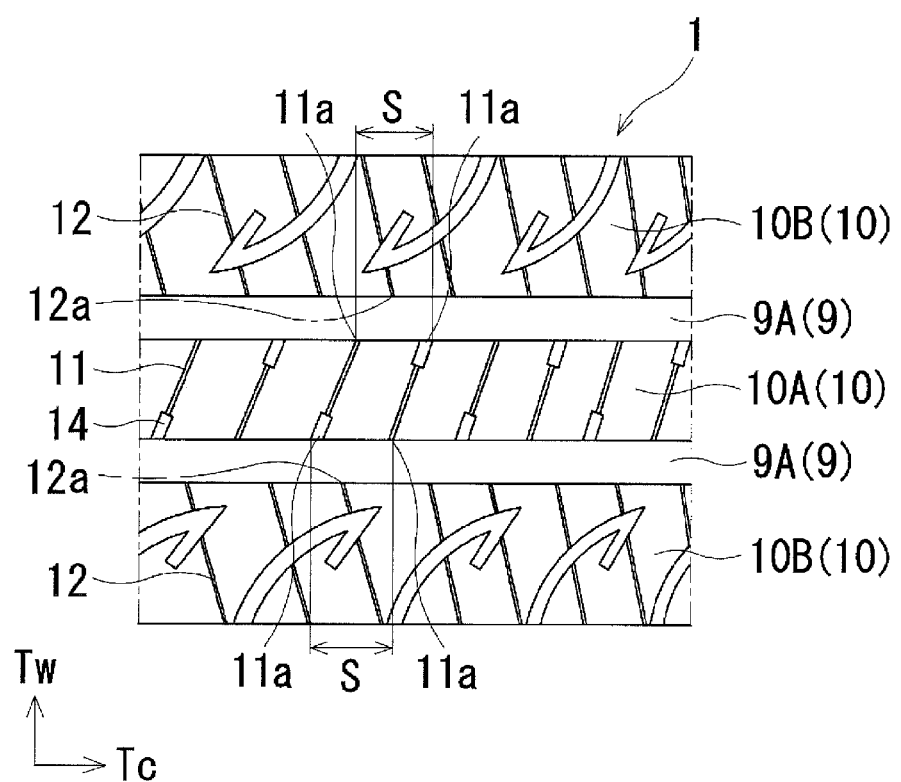
FIG. 3 is an enlarged plan view illustrating a center land portion and an intermediate land portion of the tread portion in FIG. 2.

Configurations of embodiments of the present technology will be described in detail below with reference to the accompanying drawings. FIGS. 1 to 3 illustrate a pneumatic tire according to an embodiment of the present technology. In FIGS. 2 and 3, Tc indicates the tire circumferential direction and Tw indicates the tire lateral direction.

As illustrated in FIG. 1, a pneumatic tire according to an embodiment of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, the reinforcing cords being disposed between layers in a criss-cross manner. In the belt layers 7, the inclination angle of the reinforcing cords with respect to the tire circumferential direction falls within a range from 10° to 40°, for example. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

As illustrated in FIG. 2, four main grooves 9 extending in the tire circumferential direction are formed in the tread portion 1. The main grooves 9 includes a pair of inner main grooves 9A, 9A located on both sides of the tire center line CL and a pair of outer main grooves 9B, 9B located on the outermost side in the tire lateral direction. The tread portion 1 is divided into land portions 10 in by the four main grooves 9. The land portions 10 include a center land portion 10A located on the tire center line CL, a pair of intermediate land portions 10B, 10B located outward of the center land portion 10A in the tire lateral direction, and a pair of shoulder land portions 10C, 10C located outward of the intermediate land portions 10B, 10B in the tire lateral direction.

The center land portion 10A, the intermediate land portions 10B, and the shoulder land portions 10C each are provided with a plurality of sipes 11, 12, and 13, respectively, at intervals in the tire circumferential direction. Further, the intermediate land portions 10B and the shoulder land portions 10C each are provided with a plurality of lug grooves 21, 24 inclined in the tire circumferential direction, respectively, at intervals in the tire circumferential direction.

Both ends of the sipes 11 in the center land portion 10A communicate with the pair of inner main grooves 9A, 9A. That is, the sipe 11 is an open sipe. The sipe 11 has a single widened portion 14 formed with a wide groove width to increase edge components. The widened portion 14 is disposed on one side of the sipe 11, and the sipe 11 communicates with the inner main groove 9A via the widened portion 14. Such sipes 11 are alternately disposed in the tire circumferential direction.

One end of the sipe 12 of the intermediate land portion 10B communicates with the inner main groove 9A, and the other end communicates with the outer main groove 9B. That is, the sipe 12 is an open sipe. The sipe 12 has a structure divided into a plurality of sections by the lug grooves 21, but the divided portions of the same sipe 12 are disposed on the same straight line.

Both ends of the sipe 13 in the shoulder land portion 10C terminate within the shoulder land portion 10C. That is, the sipe 13 is a closed sipe. The sipes 13 extend from the outer side of the ground contact end E in the tire lateral direction toward the outer main groove 9B, improving snow performance.

The sipes 11 in the center land portion 10A, the sipes 12 in the intermediate land portions 10B, and the sipes 13 in the shoulder land portions 10C are all inclined with respect to the tire circumferential direction. These sipes 11 to 13 are not inclined in the same direction with respect to the tire circumferential direction. In other words, the orientation of the sipes 11 in the center land portion 10A with respect to the tire circumferential direction is the same as the orientation of the sipes 13 in the shoulder land portions 10C, while the orientation of the sipes 12 in the intermediate land portions 10B with respect to the tire circumferential direction is opposite to the orientation of the sipes 11, 13.

An inclination angle of the sipes 11 to 13 with respect to the tire circumferential direction is defined as θ. At this time, an inclination angle $\theta_{CE}$ of the sipes 11 in the center land portion 10A, an inclination angle $\theta_{MD}$ of the sipes 12 in the intermediate land portions 10B, and an inclination angle $\theta_{SH}$ of the sipes 13 in the shoulder land portion 10C satisfy a relationship $\theta_{CE} < \theta_{MD} < \theta_{SH} < 90°$. The sipes 13 in the shoulder land portions 10C are set to be substantially perpendicular to the tire circumferential direction. In particular, it is preferred that the inclination angle $\theta_{CE}$ ranges from 60° to 75°, the inclination angle $\theta_{MD}$ ranges from 70° to 85°, and the inclination angle $\theta_{SH}$ ranges from 83° to 88°. Alternatively, it is preferred that a ratio of the inclination angle $\theta_{CE}$ to the inclination angle $\theta_{MD}$ ranges from 85% to 95%, and a ratio of the inclination angle $\theta_{MD}$ to the inclination angle $\theta_{SH}$ ranges from 80% to 95%. Note that the inclination angle θ is an inclination angle on the acute angle side of the sipe with respect to the tire circumferential direction.

As illustrated in FIG. 3, an end 12a of each sipe 12 in the intermediate land portion 10B on the side of the inner main groove 9A is disposed between ends 11a of the adjacent sipes 11 in the center land portion 10A on the side of the inner main groove 9A in the tire circumferential direction. That is, the end 12a of each sipe 12 is disposed in a section S in the tire circumferential direction that faces the inner main groove 9A. Additionally, at any position on the entire circumference of the tire, at least one of the sipe 11 in the center land portion 10A and/or the sipe 12 in the intermediate land portion 10B is present on the tire meridian. In other words, when the tread portion 1 is cut along the tire lateral direction, the sipes 11 in the center land portion 10A and the sipes 12 in the intermediate land portion 10B are disposed so as to overlap each other in the tire circumferential direction.

In the pneumatic tire described above, the center land portion 10A, the intermediate land portions 10B, and the shoulder land portions 10C each are provided with the plurality of sipes 11 to 13, respectively, arranged at intervals in a tire circumferential direction, the sipes 11 in the center land portion 10A each have the widened portion 14 formed with a wide groove width at one end thereof, and the sipes 13 in the shoulder land portions 10C each extend from the outer side of the ground contact end E in the tire lateral direction toward outer main groove 9B. Therefore, snow performance (particularly steering stability performance on snow-covered road surfaces) can be improved while efficiently increasing edge components. Since the orientation of the sipes 11, 13 in the center land portion 10A and the shoulder land portions 10C with respect to the tire circumferential direction is opposite to the orientation of the sipes 12 in the intermediate land portions 10B, the sipes 11 to 13 in the land portions 10A to 10C appropriately act on the ground contact leading edge, and since the inclination angle $\theta_{CE}$ of the sipes 11, the inclination angle $\theta_{MD}$ of the sipes 12, and the inclination angle $\theta_{SH}$ of the sipe 13 satisfy the relationship $\theta_{CE} < \theta_{MD} < \theta_{SH} < 90°$, the generation of pattern noise can be suppressed while improving snow performance. Additionally, since the end 12a of the sipe 12 in the intermediate land portion 10B is disposed between ends 11a of the adjacent sipes 11 in the center land portion 10A in the tire circumferential direction, and at any position on the entire circumference of the tire, at least one of the sipe 11 in the center land portion 10A and/or the sipe 12 in the intermediate land portion 10B is present on the tire meridian, variations in the area of the grooves at the ground contact leading edge can be suppressed, thereby reducing the occurrence of pattern noise.

In FIG. 2, the sipes 13 in the shoulder land portions 10C do not communicate with the outer main groove 9B. With the sipe 13 of such a structure, a decrease in block rigidity in the shoulder land portion 10C can be suppressed, thereby effectively suppressing the occurrence of pattern noise. In contrast, when the sipes 13 in the shoulder land portions 10C communicate with the outer main grooves 9B, block rigidity decreases, which disadvantageously leads to deterioration of pattern noise.

Additionally, a width W1 of the center land portion 10A, a width W2 of the intermediate land portion 10B, and a width W3 of the shoulder land portion 10C in the ground contact region satisfy a relationship W1<W2<W3. By setting the widths W1 to W3 of the land portions 10A to 10C so as to satisfy such relationship, edge components contributing to the improvement of snow braking and snow traction can be increased, effectively improving snow performance. Specifically, the width W3 of the shoulder land portion 10C in the ground contact region is the width from the end of the shoulder land portion 10C on the side of the outer main groove 9B to the ground contact end E.

Further, one end 21a of the lug groove 21 in the intermediate land portion 10B opens to the outer main groove 9B, while the other end 21b terminates in the intermediate land portion 10B. The lug grooves 21 each intersect with the sipe 12, and are disposed so as not to overlap each other in the tire circumferential direction. In particular, in order to improve snow performance, the lug groove 21 may preferably intersect with the plurality of sipes 12. The lug groove 21 includes an acute bent portion 22 formed at a position between the one end 21a and the other end 21b. On the other hand, the lug grooves 24 in the shoulder land portions 10C do not communicate with the outer main grooves 9B. The lug grooves 24 in the shoulder land portions 10C extend from the outer side of the ground contact end E in the tire lateral direction toward the outer main groove 9B.

As described above, since the intermediate land portion 10B includes the plurality of lug grooves 21 extending in the tire circumferential direction while intersecting with the sipe 12 in the intermediate land portion 10B, snow performance can be improved, and variations in the area of the grooves at the ground contact leading edge can be reduced. Additionally, the one end 21a of the lug groove 21 opens to the outer main groove 9B, while the other end 21b terminates in the intermediate land portion 10B. Thus, the occurrence of pattern noise can be suppressed. Further, since each of the lug grooves 21 in the intermediate land portion 10B has the acute bent portion 22, edge components can be increased to effectively improve snow performance.

In the above-mentioned embodiments of FIGS. 2 and 3, the sipes 11 in the center land portion 10A and the sipes 12 in the intermediate land portions 10B each are an open sipe with both ends that communicate with the main grooves 9 and however, may be a semi-closed sipe with one end that does not communicate with the main groove 9, or a closed-sipe with both ends that do not communicate with the main groove 9.

Although the lug grooves 24 do not communicate with the outer main grooves 9B in the above-mentioned embodiment in FIG. 2, the lug grooves 24 may communicate with the outer main groove 9B via another sipe. In this case, another sipe is a sipe extending along the tire lateral direction between an end of the lug groove 24 on the side of the outer main groove 9B and the outer main groove 9B.

Example

Tires in Examples 1 to 6 were produced by using a tire of a tire size 225/50R18 that includes: an annular tread portion extending in a tire circumferential direction; a pair of sidewall portions disposed on both sides of the tread portion; and a pair of bead portions disposed inward of the sidewall portions in the tire radial direction, the tread portion being provided with four main grooves including a pair of outer main grooves and a pair of inner main grooves that extend in a tire circumferential direction, the main grooves defining a center land portion, a pair of intermediate land portions located outward of the center land portion, and a pair of shoulder land portions located outward of the intermediate land portions, wherein the center land portion, the intermediate land portions, and the shoulder land portions each are provided with a plurality of sipes arranged at intervals in the tire circumferential direction, the sipes in the center land portion each have a widened portion formed with a wide groove width at one end, the sipes in the shoulder land portions each extend from an outer side of a ground contact end in a tire lateral direction toward the outer main groove, orientation of the sipes in the center land portion and the shoulder land portions with respect to the tire circumferential direction is opposite to orientation of the sipes in the intermediate land portions, an inclination angle $\theta_{CE}$, an inclination angle $\theta_{MD}$, and an inclination angle $\theta_{SH}$ of the sipes in the shoulder land portion satisfy a relationship $\theta_{CE} < \theta_{MD} < \theta_{SH} < 90°$, an end of the sipe in the intermediate land portion on the side of the inner main groove is disposed between ends of the adjacent sipes in the center land portion in the tire circumferential direction, and at any position on the entire circumference of the tire, at least one of the sipe in the center land portion and/or the sipe in the intermediate land portion is present on a tire meridian, under different conditions for positional relationship between the ends of the sipes in the center land portion and the intermediate land portion, the inclination direction of the sipes in each of the land portions with respect to the tire circumferential direction, the presence/absence of the non-overlapping locations of the sipes in the center land portion and the intermediate land portions, the configuration of the sipes in the shoulder land portions, the dimensional relationship between the widths W1, W2, W3 of the land portions, the presence/absence of lug grooves in the intermediate land portions, the number of sipes intersecting with the lug grooves in the intermediate land portions, and the presence/absence of the bent portions in the lug grooves of the intermediate land portions, as indicated in Table 1.

For comparison, there was prepared a tire in Conventional Example having the same configuration as the tire in Example 1 except that the end of each sipe in the intermediate land portions on the side of the inner main groove is disposed opposed to the end of each sipe in the center land portions on the side of the inner main groove, the orientation of the center land portion, the intermediate land portions, and the shoulder land portions with respect to the tire circumferential direction is uniform, and at any position on the entire circumference of the tire, both of the sipe in the center land portion and the sipe in the intermediate land portions were not present on the tire meridian. Additionally, there were prepared a tire in Comparative Example 1 having the same configuration as the tire in Example 1 except that the orientation of the center land portion, the intermediate land portions, and the shoulder land portions with respect to the tire circumferential direction is uniform, and at any position on the entire circumference of the tire, both of the sipe in the center land portion and the sipe in the intermediate land portions were not present on the tire meridian, and a tire in Comparative Example 2 having the same configuration as the tire in Example 1 except that at any position on the entire circumference of the tire, both of the sipe in the center land portion and the sipe in the intermediate land portions were not present on the tire meridian.

Note that regarding "positional relationship between ends of sipes in the center land portion and the intermediate land portion" in Table 1, "uniform" means that the end of each sipe in the intermediate land portions on the side of the inner main groove is disposed opposed to the end of each sipe in the center land portions on the side of the inner main groove, and "non-uniform" means that the end of each sipe in the intermediate land portions on the side of the inner main groove is disposed between the ends of the adjacent sipes in the center land portion in the tire circumferential direction. Also, regarding "presence or absence of non-overlapping locations of sipes in center land portion and intermediate land portion" in Table 1, "Yes" means that at any position on the entire circumference of the tire, both of the sipe in the center land portion and the sipe in the intermediate land portions were not present on the tire meridian, and "No" means that at any position on the entire circumference of the tire, at least one of the sipe in the center land portion and the sipe in the intermediate land portions were not present on the tire meridian.

These test tires underwent a sensory evaluation by a test driver for steering stability performance on snow-covered road surfaces and pattern noise. The results thereof are shown in Table 1.

The sensory evaluation for steering stability performance on snow-covered road surfaces was performed with the test tires on a wheel with a rim size of 18×7 J mounted on a front-wheel drive vehicle. The evaluation results were shown as 10 grade evaluation values. Larger index values indicate superior steering stability performance on snow-covered road surfaces.

The sensory evaluation for pattern noise was performed with the test tires on a wheel with a rim size of 18×7 J mounted on a front-wheel drive vehicle. The evaluation results were shown as 10 grade evaluation values. Larger index values indicate superior suppressing effect on the occurrence of pattern noise.

TABLE 1

|  | Conventional Example | Comparative Example 1 | Comparative Example 2 |
| --- | --- | --- | --- |
| Positional relationship between ends of sipes in center land portion and intermediate land portion | Uniform | Not uniform | Not uniform |
| Inclination direction of sipes in each land portion with respect to tire circumferential direction | Same direction | Same direction | Opposite direction only in intermediate land portion |
| Presence/absence of non-overlapping location of each sipe in center land portion and intermediate land portion | Yes | Yes | Yes |
| Configuration of sipes in shoulder land portion | Communicate with main groove | Communicate with main groove | Communicate with main groove |
| Dimensional relationship between widths W1, W2, W3 of land portions | W1 = W2 < W3 | W1 = W2 < W3 | W1 = W2 < W3 |

TABLE 1-continued

|  |  |  |  |
|---|---|---|---|
| Presence/absence of lug grooves in intermediate land portions | No | No | No |
| Number of sipes that intersect with lug groove in intermediate land portions | — | — | — |
| Presence/absence of bent portion of lug groove in intermediate land portion | — | — | — |
| Steering stability performance on snow-covered road surfaces | 5.0 | 5.0 | 5.5 |
| Pattern noise | 5.0 | 5.5 | 6.0 |

|  | Example 1 | Example 2 | Example 3 |
|---|---|---|---|
| Positional relationship between ends of sipes in center land portion and intermediate land portion | Not uniform | Not uniform | Not uniform |
| Inclination direction of sipes in each land portion with respect to tire circumferential direction | Opposite direction only in intermediate land portion | Opposite direction only in intermediate land portion | Opposite direction only in intermediate land portion |
| Presence/absence of non-overlapping location of each sipe in center land portion and intermediate land portion | No | No | No |
| Configuration of sipes in shoulder land portion | Communicate with main groove | Not communicate with main groove | Not communicate with main groove |
| Dimensional relationship between widths W1, W2, W3 of land portions | W1 = W2 < W3 | W1 = W2 < W3 | W1 < W2 < W3 |
| Presence/absence of lug grooves in intermediate land portions | No | No | No |
| Number of sipes that intersect with lug groove in intermediate land portions | — | — | — |
| Presence/absence of bent portion of lug groove in intermediate land portion | — | — | — |
| Steering stability performance on snow-covered road surfaces | 5.5 | 5.5 | 6.0 |
| Pattern noise | 6.5 | 7.0 | 7.0 |

|  | Example 4 | Example 5 | Example 6 |
|---|---|---|---|
| Positional relationship between ends of sipes in center land portion and intermediate land portion | Not uniform | Not uniform | Not uniform |
| Inclination direction of sipes in each land portion with respect to tire circumferential direction | Opposite direction only in intermediate land portion | Opposite direction only in intermediate land portion | Opposite direction only in intermediate land portion |
| Presence/absence of non-overlapping location of each sipe in center land portion and intermediate land portion | No | No | No |
| Configuration of sipes in shoulder land portion | Not communicate with main groove | Not communicate with main groove | Not communicate with main groove |
| Dimensional relationship between widths W1, W2, W3 of land portions | W1 < W2 < W3 | W1 < W2 < W3 | W1 < W2 < W3 |
| Presence/absence of lug grooves in intermediate land portions | Yes | Yes | Yes |
| Number of sipes that intersect with lug groove in intermediate land portions | 1 | 2 | 1 |
| Presence/absence of bent portion of lug groove in intermediate land portion | No | No | Yes |

TABLE 1-continued

| | | | |
|---|---|---|---|
| Steering stability performance on snow-covered road surfaces | 6.5 | 7.0 | 7.0 |
| Pattern noise | 7.0 | 7.0 | 7.0 |

As can be seen from Table 1, the tires in Examples 1 to 6 had improved steering stability performance on snow-covered road surfaces and pattern noise in a well-balanced manner as compared to the tire in Conventional Example.

In the tire of Comparative Example 1, the sipes in the center land portions, the intermediate land portions, and the shoulder land portions had the same orientation with respect to the tire circumferential direction, and at any position on the entire circumference of the tire, both of the sipes in the center land portion and the sipes in the intermediate land portion were not present on the tire meridian. Thus, sufficient improvement in steering stability performance on snow-covered road surfaces and pattern noise could not be achieved. In the tire in Comparative Example 2, since both of the sipes in the center land portion and the sipes in the intermediate land portion were not present on the tire meridian at any position on the entire circumference of the tire, sufficient improvement in pattern noise could not be achieved.

The invention claimed is:

1. A pneumatic tire comprising:
an annular tread portion extending in a tire circumferential direction;
a pair of sidewall portions disposed on both sides of the tread portion; and
a pair of bead portions disposed inward of the sidewall portions in a tire radial direction,
the tread portion being provided with four main grooves including a pair of outer main grooves and a pair of inner main grooves that extend in the tire circumferential direction, the main grooves defining a center land portion, a pair of intermediate land portions located outward of the center land portion, and a pair of shoulder land portions located outward of the intermediate land portions, wherein
the center land portion, the intermediate land portions, and the shoulder land portions each are provided with a plurality of sipes arranged at intervals in the tire circumferential direction, the sipes in the center land portion each have a widened portion formed with a wide groove width at one end, the sipes in the shoulder land portions each extend from an outer side of a ground contact end in a tire lateral direction toward the outer main groove, orientation of the sipes in the center land portion and the shoulder land portions with respect to the tire circumferential direction is opposite to orientation of the sipes in the intermediate land portions, an inclination angle $\theta_{CE}$ of the sipes in the center land portion with respect to the tire circumferential direction, an inclination angle $\theta_{MD}$ of the sipes in the intermediate land portions with respect to the tire circumferential direction, and an inclination angle $\theta_{SH}$ of the sipes in the shoulder land portion with respect to the tire circumferential direction satisfy a relationship $\theta_{CE} < \theta_{MD} < \theta_{SH} < 90°$, and
an end of each sipe in the intermediate land portions on the side of the inner main grooves is disposed between ends of adjacent sipes in the center land portion in the tire circumferential direction, and at any position on an entire circumference of the tire, at least one of a sipe among the sipes in the center land portion or a sipe among the sipes in the intermediate land portions is present on a tire meridian.

2. The pneumatic tire according to claim 1, wherein the sipes in the shoulder land portions do not communicate with the outer main groove.

3. The pneumatic tire according to claim 1, wherein a width W1 of the center land portion, a width W2 of each of the intermediate land portions, and a width W3 of each of the shoulder land portions in a ground contact region satisfy a relationship W1<W2<W3.

4. The pneumatic tire according to claim 1, wherein a plurality of lug grooves extending in the tire circumferential direction while intersecting with the sipes in the intermediate land portions are provided in the intermediate land portions, and one end of the lug grooves opens to one of the outer main grooves, and an other end terminates within the intermediate land portions.

5. The pneumatic tire according to claim 1, wherein each of lug grooves in the intermediate land portions has an acute bent portion.

6. The pneumatic tire according to claim 2, wherein a width W1 of the center land portion, a width W2 of each of the intermediate land portions, and a width W3 of each of the shoulder land portions in a ground contact region satisfy a relationship W1<W2<W3.

7. The pneumatic tire according to claim 6, wherein a plurality of lug grooves extending in the tire circumferential direction while intersecting with the sipes in the intermediate land portions are provided in the intermediate land portions, and one end of the lug grooves opens to one of the outer main grooves, and an other end terminates within the intermediate land portions.

8. The pneumatic tire according to claim 7, wherein each of the lug grooves in the intermediate land portions has an acute bent portion.

\* \* \* \* \*